US006661368B1

(12) United States Patent
Allen et al.

(10) Patent No.: US 6,661,368 B1
(45) Date of Patent: Dec. 9, 2003

(54) CONTROL OF REFLECTED ELECTROMAGNETIC FIELDS AT AN IFSAR ANTENNA

(75) Inventors: Steven E. Allen, Albuquerque, NM (US); Billy C. Brock, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/052,928

(22) Filed: Oct. 29, 2001

(51) Int. Cl.[7] .............................................. G01S 13/90
(52) U.S. Cl. ............................ 342/25; 342/1; 342/147; 342/156; 342/190; 342/191
(58) Field of Search ................................ 342/1–12, 25, 342/175, 147, 156, 159, 176, 177–195, 417, 422, 423, 424; 343/705, 772, 773–786

(56) References Cited

U.S. PATENT DOCUMENTS 4,651,160 A * 3/1987 Bornkast et al. ............... 342/4
5,298,906 A * 3/1994 Lantagne et al. ........... 342/175
5,436,630 A * 7/1995 Nash ............................. 342/10
6,111,535 A * 8/2000 Smith ......................... 342/175

OTHER PUBLICATIONS

Burns et al., "IFSAR for the Rapid Terrain Visualization Demonstration"; Proceedings of the 34th Asilomar Conference on Signals, Systems, and Computers; Pacific Grove, California; Oct. 30, 2000.*
D. L. Bickel & W. H. Hensley, "Design, Theory, and Applications of Interferometric Synthetic Aperture Radar for Topographic Mapping", SAND96–1092—UC–706, pp. 3–14, 79–80.
Burns, Eichel, Hensley & Kim, "IFSAR for the Rapid Terrain Visualization Demonstration", 34h Asilomar Conference on Signals, Systems and Computers.

* cited by examiner

Primary Examiner—Bernarr E. Gregory
(74) Attorney, Agent, or Firm—George H. Libman

(57) ABSTRACT

A system for reducing multi-path reflections from adjacent metal objects which cause distortion in an IFSAR includes a reflective cone extending between the top of the IFSAR and the skin of its aircraft, and a reflective shroud surrounding the IFSAR. Each of these components may be coated with radar absorbing material.

20 Claims, 4 Drawing Sheets

CONTROL OF REFLECTED ELECTROMAGNETIC FIELDS AT AN IFSAR ANTENNA

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

Synthetic aperture radar (SAR) is used to obtain two-dimensional images of the ground from an airborne platform. The SAR antenna typically points toward the ground perpendicular to the path of the aircraft. SAR collects data while flying a predictable path (either a straight line to view a strip of ground or a circular path to view a spot of ground) and then processes the data as if it came from a physically long antenna. The distance the aircraft flies in synthesizing the antenna is known as the synthetic aperture. A narrow synthetic beamwidth results from the relatively long synthetic aperture, which yields finer resolution than is possible from a smaller physical antenna. SAR systems may survey the ground from an aircraft several miles from the target, and they may provide two dimensional views of the target with a resolution better than one foot.

Interferometric synthetic aperture radar (IFSAR) is a relative of SAR which uses two antennas separated in elevation to produce estimates of terrain elevation in a SAR image; i.e., a three dimensional view of the ground. Each transmitted pulse is received at the two antennas, and phase difference information from the return pulse at each antenna is used to estimate the angle of arrival of the received pulse. For a level radar platform, changes in angle-of-arrival indicate a change in elevation of the target. Detailed background information on IFSAR may be found in D. Bickel et al., "Design, Theory, and Applications of Interferometric Synthetic Aperture Radar for Topographic Mapping," Sandia National Laboratories Report SAND96-1092, May 1996, available through DOE/OSTI.

Since the path of the aircraft may deviate from an ideal straight line by considerably more than one foot, high quality SAR and IFSAR systems utilize a combination of state of the art electronics, algorithms, data processing, and hardware to compensate for spurious motion of the vehicle, the effects of weather on the signal, and many other factors. Detail is important, as anything that is overlooked is likely to degrade the image.

High quality prior art IFSAR systems have experienced difficulty controlling the phase response of the system as a function of elevation angle. This lack of control often puts 'waves' of height error into the elevation output of the system. This invention is the result of the inventors' understanding that the cause of these waves is low-amplitude signals reflected from metal near the antennas (such as the body of the aircraft) that add to the direct-path signal. These multi-path signals cause phase errors that produce an unpredictable system phase response as a function of elevation angle.

SUMMARY OF THE INVENTION

It is an object of this invention to significantly reduce the amplitude of reflected signals from the aircraft which add to the direct-path signal.

It is another object of this invention to provide a conical diffraction grating around the radar to direct reflected signals from the aircraft away from impinging the radar antenna.

It is also an object of this invention to provide a shroud around the radar antennas to prevent undesirable signals from impinging the radar antennas.

To achieve the foregoing and other objects, and in accordance with the purpose of the present invention, as embodied and broadly described herein, a system for reducing phase errors from scattering in an IFSAR comprises a shroud made of radar reflective material extending around the IFSAR antenna surface, the shroud shielding said surface from reflected energy from objects adjacent said surface and not along said beam. Furthermore, the invention comprises a radar reflective cone mounted to the aircraft and above the IFSAR to reflect energy which strikes the aircraft adjacent the IFSAR away from the IFSAR.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
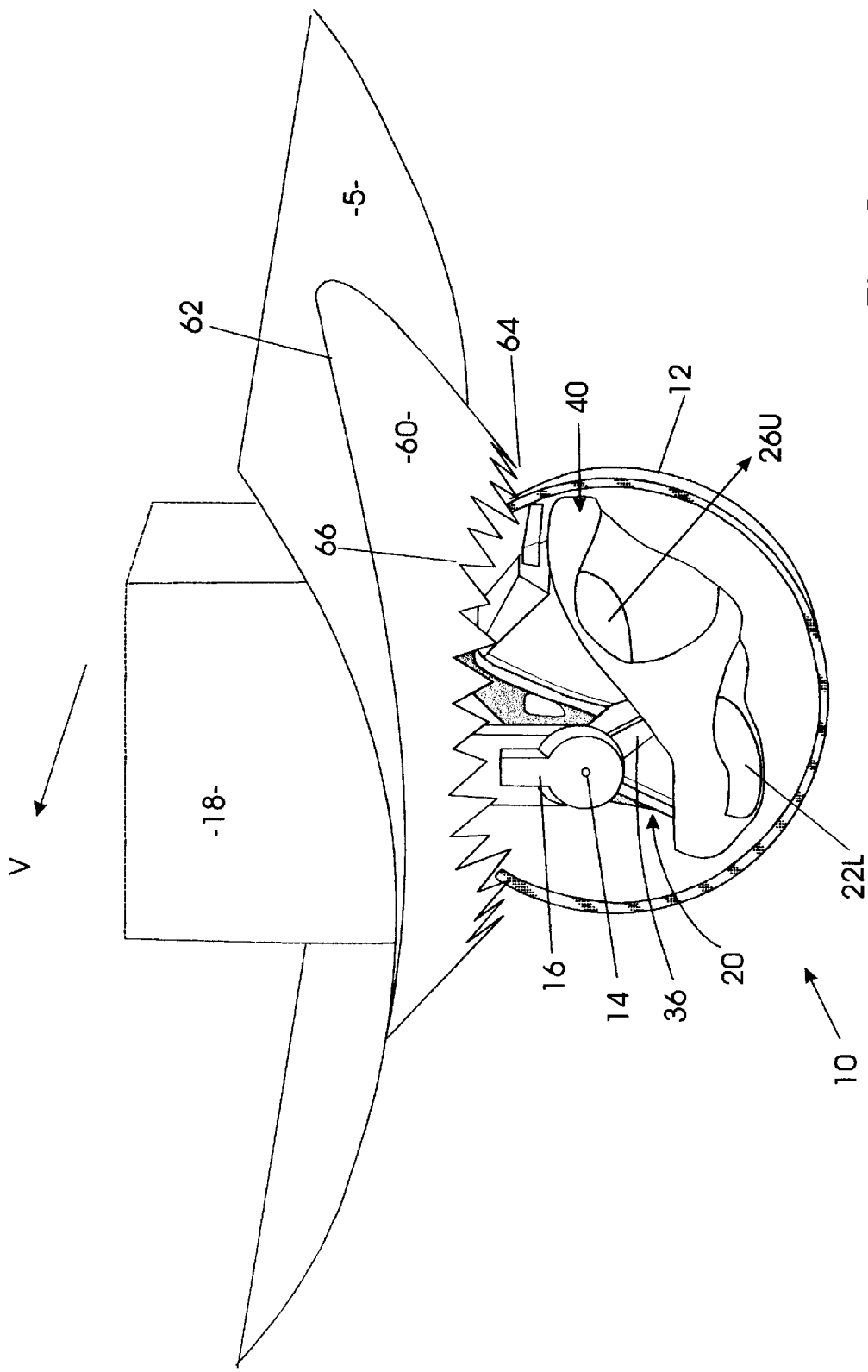
FIG. 1 is a partial cutaway view of the invention.

FIG. 1 shows an IFSAR system 10 incorporating the features of this invention suspended through a portion of the skin 5 of an aircraft. System 10 can include an antenna element 20, an antenna shroud 40, and diffraction cone 60. Antenna element 20 and antenna shroud 40 can be rigidly mounted together as an antenna unit by a brace 36. The antenna unit pivots within conventional radome 12 around a horizontal axis 14 on a spaced pair of gimbals (of which one gimbal 16 is shown), and around a vertical axis on another set of gimbals (not shown) in a manner conventional in the radar art. The IFSAR is stabilized and controlled by hardware and electronics mounted in volume 18 within the aircraft. Other than as disclosed hereinafter, the details of IFSAR construction and control, including its stabilizing structure, are known to those of ordinary skill in this art. The IFSAR of FIG. 1 is shown in a typical operating position looking in direction 26U toward the ground at an angle of about 45° below horizontal and 90° from the flight path V of the aircraft.

Figure 2:
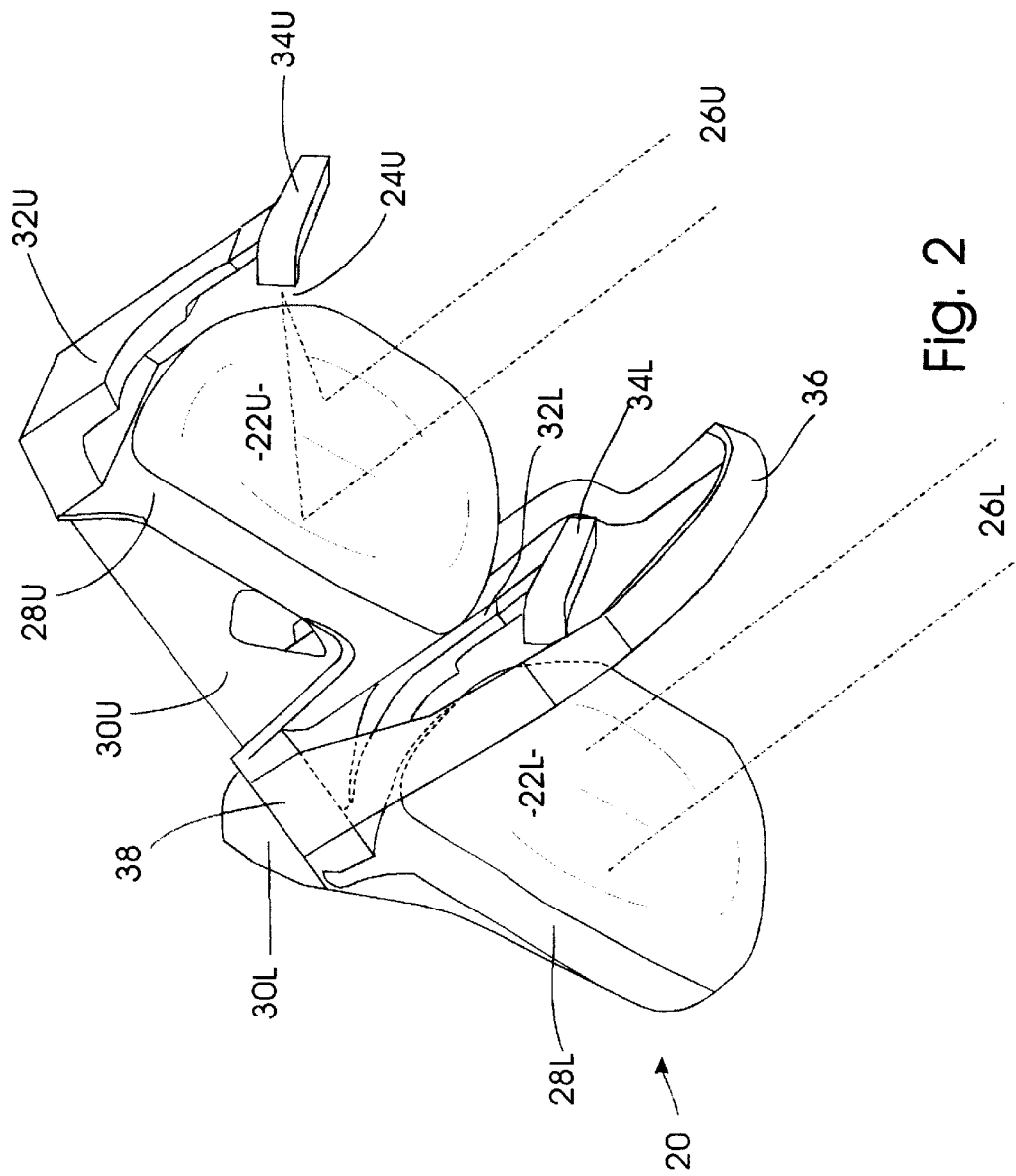
FIG. 2 shows the antenna assembly of the invention.

A preferred embodiment of antenna element 20 is shown in FIG. 2 to include an upper antenna 22U and a lower antenna 22L. (When necessary, antenna parts will be identified with U for parts associated with upper antenna 22U and L for parts with lower antenna 22L. Parts being described for either each antenna will be referenced only by the identifying numeral.) Each antenna 22 is a reflecting surface formed as a portion of a parabolic reflector that radiates energy to or from a focal point 24 as a parallel collimated beams 26. To maintain the precise relationship between upper and lower antennas 22 and their focal points 24, antenna element 20 is typically machined from a single block of metal such as aluminum. The method of construction for this antenna predates this invention.

Each antenna 22 has a rim 28 that surrounds the reflecting surface. Each antenna also has a vertical web 30 extending from the rear of the antenna to provide stiffness and weight to the structure. Furthermore, each antenna has an upper arm 32 extending above the upper edge of rim 28 to a point in front of and above the reflecting surface where a feedhorn 34 is mounted such that the output-input of feedhorn 34 is at focal point 24.

There are other elements of IFSAR system that are not shown because they are conventional in the art and because they are not necessary for an understanding of the improvement defined by this invention. For example, waveguide is connected to each feedhorn 34, and external weights are conventionally added the antenna element to balance the system.

A rigid brace 36 extends from two spaced connection points 38 on either side of, and between, the upper and lower antennas 22. Brace 36 forms a generally curved path that surrounds lower feedhorn 34L and which does not interfere with either beam 26. Brace 36 is used to fasten shroud 40 to antenna element 20.

Figure 3B:
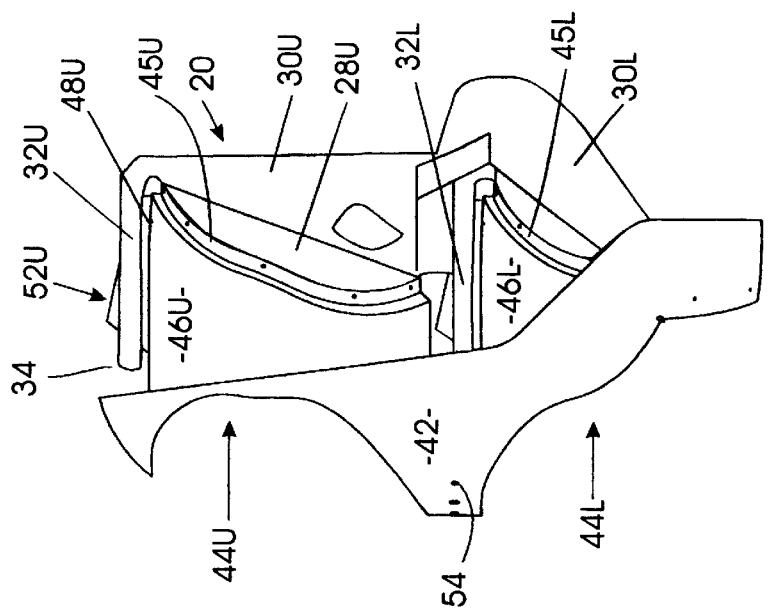
FIGS. 3A and 3B are front and side views of the shroud of the invention.
Figure 3A:
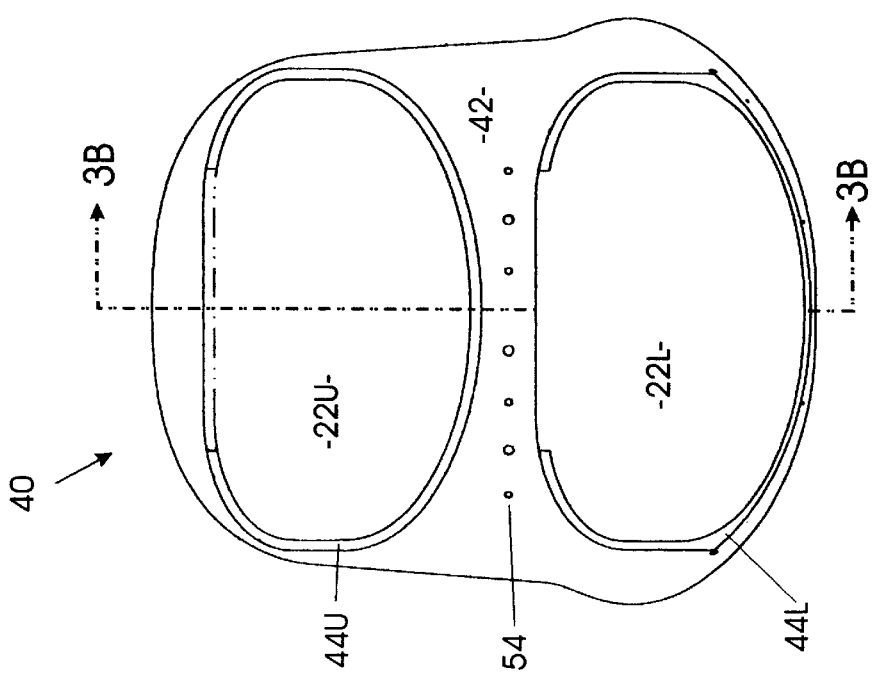

FIGS. 3A and 3B illustrate a preferred embodiment of shroud 40 connected to antenna element 20, which is shaded in the figures for clarity. Shroud 40 is preferably manufactured of an electrically conductive material coated with a radar absorbing material. A carbon fiber material was used as the substrate in one embodiment of the invention, as it was a relatively easy conductive material to form into the required shape for shroud 40, although a metal substrate such as aluminum could also have been used. An iron-loaded nitrile rubber surface was applied to the fiber material as a radar absorbing material; other examples of radar absorbing material are known to those of ordinary skill in the radar art and also could be used in the practice of the invention.

Shroud 40 shields the reflective surface 22 of each antenna from any radiation reflecting from the nearby metal structure to prevent that radiation from being reflected to focal point 24, where it would be processed as the undesirable waves noted above. In other words, shroud 40 ensures that only radiation reflected from a target and returning to the IFSAR will be received by antenna element 20; radiation reflecting from the aircraft, or from other metal surfaces within radome 12, will not reach antennas 22.

Shroud 40 is seen to preferably include a shaped front piece 42 that has an upper opening 44U and a lower opening 44L through which antennas 22U and 22L, respectively, may be seen when shroud 40 is attached to antenna element 20 as shown in FIGS. 3A and 3B. Ideally, a tubular shield extends rearwardly from each opening 44, the axis of each tubular shield being aligned to permit unobstructed passage of the antenna beam. Practically, a tubular shield 46U fits within radome 12; but visor shield 46L is a truncated tube that shields antenna 22L from radiation reflecting from above or from the side, as the bottom portion front piece 42 has a profile which conforms to the interior surface of a minimally sized radome 12. Since there is no metal beneath lower antenna 22L, which typically is suspended either under the body or wing of an aircraft so it has an unobstructed view of the ground, there is no source of reflected radiation from that direction. Therefore, the absence of shielding for the lower part of antenna 22L is not detrimental to the operation of the invention.

The rim 45 of each shield 46 is sized to couple tightly with the respective rim 28 of its associated antenna. Holes 54 indicate where shroud 40 is fastened to the front surface of brace 36 to hold shroud 40 to antenna element 20.

Figure 4:
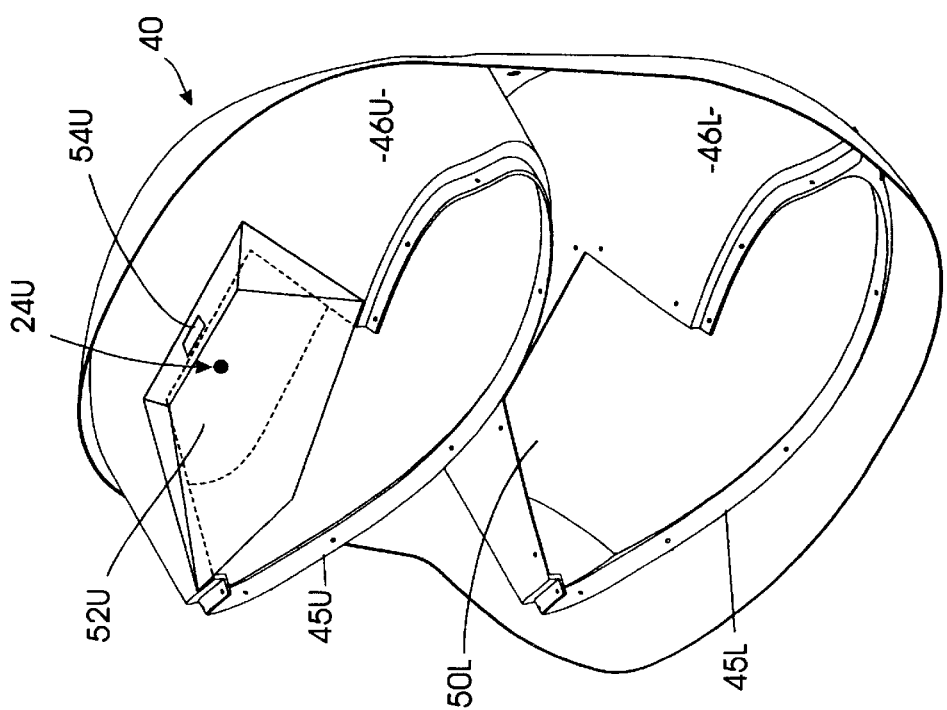
FIG. 4 is a rear view of the shroud.

As shown in FIG. 4, an additional shield 52U is provided over hole 50U in the relatively flat upper surface of tubular shield 46U. Shield 52U has a small opening 54U through which feedhorn 34U (not shown) extends under shield 52U to ensure that only radiation from focal point 24U (inside shielding 52U) has a path to shield 40. Another shield 52L (not shown) is placed over hole 50L. Both shields 52 are preferably made of the same materials as shroud 40. By completely surrounding each focal point 24 with shielding except for the line-of-sight to antenna 22, the possibility of reflected radiation from the aircraft skin or other metal parts within radome 12 reaching feedhorn 34 at focal point 24 is greatly reduced.

FIG. 3B shows a side view of shroud 40 connected to antenna element 20, with brace 36 omitted for clarity. Each upper arm 32 fits over upper portion 48 of shield 46 and holds a waveguide 34 at focal point 24. Reflected radiation from the aircraft which strikes the rear of antenna element 20 does not affect the operation of the IFSAR; reflected radiation which is directed at the antenna surfaces 22 is reflected by shroud 40 after being attenuated by radar absorbing material in shroud 40.

Figure 5:
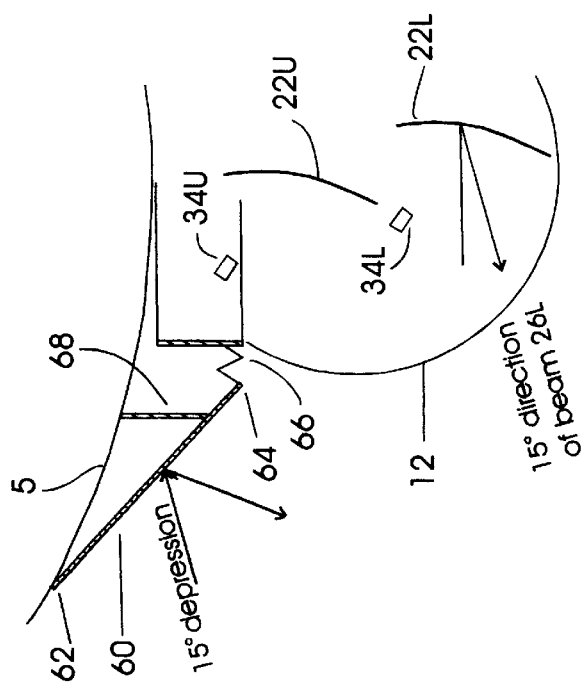
FIG. 5 is a simplified cutaway view of the invention showing the operation of the cone of the invention.

As shown in FIGS. 1 and 5, truncated diffraction cone 60 is another line of defense against the unwanted reflected radiation. Because of its relatively simple shape, an embodiment of cone 60 was formed of aluminum and coated with radar absorbing material. It could have been formed of any other electrically conductive rigid material. Cone 60 has a large end 62 which mates tightly with the surface 5 of the aircraft and a smaller end 64 adjacent radome 12. Smaller end 64 has an opening sized to surround radome 12, and is sized slightly larger than the diameter of radome 12 if volume 18 includes an elevator for raising the IFSAR 10 into the aircraft when it is not in use. Smaller end 64 is located just above the beam of upper antenna 22U. The edge of smaller end 64 is preferably serrated with a plurality of sawteeth 66 that point generally toward radome 12. A cylindrical inner support 68 provides support for cone 60.

As shown in FIG. 5, diffraction cone 60 is designed to reflect errant energy away from the IFSAR antennas. In the figure, the beam 26 for each antennas 22 is at an angle of 15° below the horizontal. Reflected radar echo energy at this angle is received by each antenna 22 and reflected to each feedhorn 34. Energy which is reflected from the target also impinges against cone 60, which is at an angle of about 43° below horizontal. The cone reflects this energy away from aircraft skin 5 and radome 12. If cone 60 were not present, the curve of aircraft skin 5 could easily reflect the energy into radome 12.

Although most of the errant energy is reflected away from the antenna, a possibility remains for currents induced in the conductive cone to generate diffracted fields at the edge of the cone. The radar absorbing material coated on cone 60 helps reduce these currents, and the sawtooth edge 66 cause the diffracted field components to be scattered in many directions, which prevents constructive interference in the region of the antenna.

It should be apparent that there are many modifications possible with this invention, as long as the concept of preventing unwanted radiation from reaching the feedhorns is followed. For example, cone 60 was made of aluminum and shroud 40 was made of conductive fibers because these materials were relatively easy to form in the shape of each object. Other conductive materials are contemplated for use for these components, subject to the strength and weight requirements of the system. Furthermore, the reflective properties of the conductive shroud and cone are believed to provide the principal protection of the invention; with the radar absorbing material providing extra protection as discussed above. However, radar absorbing material on the interior surface of shields 46 may be necessary to help prevent energy from reflecting from these surfaces onto the antenna. In addition, either one of shroud 40 or cone 60 should provide a significant reduction in the undesirable effects of multipath scattering. Results from the IFSAR system upon which both elements of the invention were installed demonstrate a reduction in multipath scattering that heretofore has not been observed in high quality IFSAR systems. (It should be remembered that only high resolution systems will even be able to detect the effects of multipath scattering; other errors will swamp these effects in lower resolution systems. In addition, although the system is described with an IFSAR having two vertically mounted antennas, it is contemplated for use with IFSARs having antennas oriented in other manner along an aircraft, such as on the side of the aircraft or spaced from each other.

It is intended that the scope of the invention be defined by the appended claims.

What is claimed is:

1. A system for reducing phase errors from scattering in an IFSAR system comprising:

an IFSAR antenna system having a reflective surface for focusing energy along a collimated beam and a feedhorn at a focal point of said reflective surface for receiving reflected energy from said surface; and a shroud made of radar reflective material extending around the reflective surface, said shroud shielding said surface from reflected energy from objects adjacent said surface and not along said beam.

2. The system of claim 1 wherein said shroud also surrounds said focal point.

3. The system of claim 1 wherein said antenna system comprises an upper antenna and a lower antenna rigidly mounted beneath said upper antenna, said upper and lower antennas having parallel beams; and said shroud comprises an upper shield extending from said upper antenna around an upper beam, and a lower shield extending from said lower antenna around a lower beam.

4. The system of claim 3 wherein said lower shield is a visor that surrounds upper and side portions of said lower beam.

5. The system of claim 4 wherein said shroud further includes a continuous front piece mounted spaced from said upper and lower antennas by said shields, said front piece having a first opening for said tubular shield and a second opening for said visor shield.

6. The system of claim 5 wherein said shroud is formed from conductive carbon fiber material.

7. The system of claim 6 wherein said shroud is coated with radar absorbing. material.

8. The system of claim 7 wherein said material is iron-loaded nitrite rubber.

9. The system of claim 5 wherein said antenna system is mounted underneath a metal skin of an aircraft, said system further comprising an electrically conductive diffraction cone having a larger diameter end affixed to said metal skin and a smaller diameter end surrounding said antenna system, the beam of said upper antenna extending beneath said smaller diameter end; wherein the angle of said cone with respect to said aircraft reflects radiation impinging on said cone away from said antenna system.

10. The system of claim 9, wherein said smaller diameter end forms a serrated edge surrounding said antenna system.

11. The system of claim 10 wherein the outside of said cone is coated with radar absorbing material.

12. A system for reducing phase errors from scattering in an IFSAR system comprising:

an IFSAR antenna for focusing energy along a collimated beam, said antenna being mounted adjacent the metal skin of an aircraft; and a truncated electrically conductive cone having a larger diameter end affixed to said metal skin and a smaller end surrounding said IFSAR antenna, said beam extending outside said smaller diameter end of said cone.

13. The system of claim 12 wherein said smaller end has a serrated edge.

14. The system of claim 12 wherein said cone is aluminum.

15. The system of claim 14 wherein the outer surface of said cone is coated with radar absorbing material.

16. The system of claim 15 wherein said radar absorbing material is iron-loaded nitrile rubber.

17. The system of claim 12 wherein the angle of said cone with respect to said skin is such that radiation from said EFSAR reflecting from a target to said cone will not reflect to said antenna.

18. The system of claim 12 wherein said system further comprises a radar reflective shroud surrounding said antenna, said beam passing through an opening in said shroud; wherein radiation reflecting from objects in the vicinity of said antenna but not along the path of said beam is reflected by said shroud.

19. The system of claim 18 wherein said TSAR antenna comprises an upper antenna rigidly mounted above a lower antenna, said upper and lower antennas having parallel beams, and said shroud comprises an upper shield extending from said upper antenna around an upper beam and a lower shield extending from said lower antenna around a lower beam.

20. The system of claim 18 further comprising a spherical radome surrounding said IFSAR antenna, wherein said lower shield is a visor shaped to conform to an inner surface of said radome.

* * * * *